United States Patent
Fergle

[11] Patent Number: 5,855,263
[45] Date of Patent: Jan. 5, 1999

[54] ONE-WAY CLUTCH AND TORQUE CONVERTER STATOR

[75] Inventor: Donald J. Fergle, Grand Blanc, Mich.

[73] Assignee: Eaton Corporation, Cleveland, Ohio

[21] Appl. No.: 810,225

[22] Filed: Feb. 28, 1997

Related U.S. Application Data

[63] Continuation-in-part of Ser. No. 771,080, Dec. 20, 1996.

[51] Int. Cl.[6] .................................................. F16D 41/12
[52] U.S. Cl. ........................ 192/46; 60/345; 192/89.2; 192/108
[58] Field of Search ........................ 192/46, 108, 89.2; 60/345

[56] References Cited

U.S. PATENT DOCUMENTS

| | | | |
|---|---|---|---|
| 633,417 | 9/1899 | Beaumont | 192/46 |
| 656,549 | 8/1900 | Kennedy. | |
| 2,104,312 | 1/1938 | Stocker. | |
| 2,710,504 | 6/1955 | Dodge. | |
| 4,441,315 | 4/1984 | Bochot | 60/345 |
| 4,711,331 | 12/1987 | Hoffmann | 192/46 |
| 5,020,648 | 6/1991 | Bush | 192/46 |
| 5,431,536 | 7/1995 | By et al. | 415/200 |
| 5,449,057 | 9/1995 | Frank | 192/46 |
| 5,586,434 | 12/1996 | Okubo et al. | 60/345 |
| 5,655,875 | 8/1997 | Sekine | 60/345 X |
| 5,690,202 | 11/1997 | Myers | 192/46 |

*Primary Examiner*—Rodney H. Bonck
*Attorney, Agent, or Firm*—L. J. Kasper

[57] ABSTRACT

A one-way clutch assembly (15) including a driven member (37) defining a plurality of driven pockets (41), with a radially moveable pawl (59) disposed in each pocket. The pockets (41) are interconnected by circumferentially-extending grooves (47), and disposed in each groove (47) is a spring member (53). Each spring member (53) includes a retaining portion (55) engaging a radially outer surface (67) of one pawl (59a), to retain the pawl in its pocket (41), and a spring portion (57) engaging a radially inner surface (69) of another pawl (59b), biasing part of the pawl toward the drive position (FIG. 6). The arrangement of the invention makes it practical to provide a one-way clutch having as few parts as possible, and being adapted for "drop-in" assembly of the clutch within a device such as a torque converter stator.

7 Claims, 5 Drawing Sheets

ONE-WAY CLUTCH AND TORQUE CONVERTER STATOR

CROSS-REFERENCE TO RELATED APPLICATIONS

This application is a Continuation-In-Part (CIP) of co-pending application U.S. Ser. No. 08/771,080, filed Dec. 20, 1996 for a "ONE-WAY CLUTCH", in the names of Donald J. Fergle, Erlen B. Walton, and James M. Brown.

STATEMENT REGARDING FEDERALLY SPONSORED RESEARCH OR DEVELOPMENT

Not Applicable

MICROFICHE APPENDIX

Not Applicable

BACKGROUND OF THE DISCLOSURE

The present invention relates to one-way clutches, and more particularly, to such clutches in which one of the members is able to overrun the other member.

More specifically, the present invention relates to such a one-way clutch (OWC) of the "radial" type, in which a drive torque or force is transmitted from one member to the other by means of a plurality of pawls (sometimes also referred to as "struts"). In a radial type OWC, one end of each of the pawls is biased to move radially outward (or radially inward) and engage the other member of the OWC assembly.

One common application for a radial type OWC is as the overrunning clutch in the stator assembly of a torque converter for a vehicle automatic transmission. This environment for an OWC is illustrated and described in U.S. Pat. No. 4,441,315, incorporated herein by reference. Typically, the manufacturer of the OWC assembly is a supplier to the manufacturer of the stator assembly and torque converter, such that the OWC is one element of the stator assembly. Therefore, those skilled in the art have recognized the desirability of an OWC which comprises a "drop-in" element, i.e., where the OWC can literally be dropped into place within the stator hub.

One obstacle to providing such a drop-in OWC of the radial type has been the fact that in many radial type OWC designs, when the OWC is held with its axis of rotation oriented vertically, various parts such as pawls or springs are susceptible to falling out of the assembly.

In an effort to maintain the radial type OWC in its assembled condition, those skilled in the art have utilized various "cage" arrangements. In a typical radial type OWC including a cage, the pawls and springs are assembled within a cage which surrounds the inner race, in much the manner of a bearing cage. One example of such a cage arrangement is illustrated and described in U.S. Pat. No. 4,711,331.

Although the use of a cage to maintain the pawls and springs in their assembled position may be functionally acceptable, it adds substantially to the number of parts in the OWC assembly, and adds to the time of assembly, thus substantially increasing the total cost of the OWC.

BRIEF SUMMARY OF THE INVENTION

Accordingly, it is an object of the present invention to provide an improved one-way clutch assembly of the radial type which facilitates the assembly being used as a "drop-in" element in a device such as the stator assembly of a vehicle torque converter.

It is another object of the present invention to provide an improved one-way clutch assembly of the radial type having individual pawls, but wherein the total number of parts required is reduced from what is taught by the prior art.

The above and other objects of the invention are accomplished by the provision of a one-way clutch assembly of the type including a radial driven member mounted for rotation about an axis, the radial driven member including a cylindrical driven face disposed parallel to the axis. A radial drive member is mounted for rotation about the axis and has a drive direction of rotation, the radial drive member including a cylindrical drive face, disposed concentrically about the driven face and spaced apart therefrom. The radial drive member defines a plurality of drive pockets, each including a drive surface. The driven face defines a plurality of driven pockets, each including a driven surface. A plurality of pawls is disposed in one of the drive and driven pockets, each of the pawls comprising a separate member, and having a retracted position in which each pawl is disposed wholly within one of the drive and driven pockets. The pawls also have a drive position in which each pawl engages both the drive surface and the driven surface as the drive and driven members transmit torque in the drive direction of rotation. The assembly includes means operable to bias the pawls toward the drive position.

The one-way clutch assembly is characterized by the means operable to bias the pawls comprising a plurality of circumferentially-elongated spring members, each being disposed circumferentially between first and second adjacent pawls. Each spring member includes a retaining portion in engagement with a radially outer surface of the first pawl to retain one portion of the first pawl in its pocket, and a spring portion in engagement with a radially inner surface of the second pawl to bias another portion of the second pawl toward the drive position.

In accordance with another aspect of the invention, the clutch assembly comprises part of a stator assembly adapted for use in a torque converter, the stator assembly being of the type comprising a stator hub and a plurality of stator blades, at least a part of the drive member being fixed to rotate with the stator hub and the plurality of stator blades, and the drive member defining the drive pockets. In one embodiment, the stator hub, the plurality of stator blades, and the drive member comprise a one-piece plastic molding. In another embodiment, the drive member comprises a hardened metal insert member which is relatively thin in the radial direction, and defines, on its inner surface, the drive pockets, and on its outer surface, a plurality of means for locking the insert member within the stator hub.

DETAILED DESCRIPTION OF THE PREFERRED EMBODIMENTS

Figure 1:
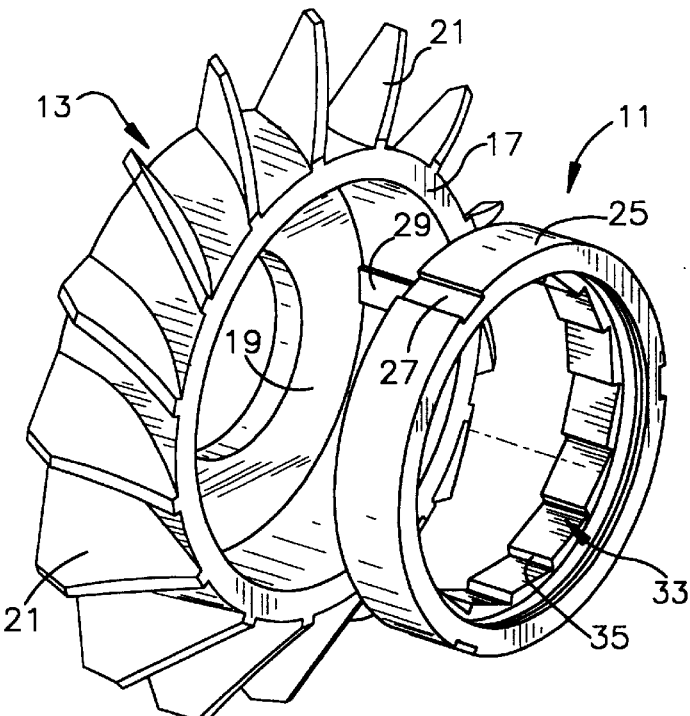
FIG. 1 is an exploded, perspective view of a stator assembly, for use in a torque converter of an automatic transmission, including the drive member of the present invention.

Referring now to the drawings, which are not intended to limit the invention, FIG. 1 is an exploded, perspective view of a stator assembly for use in a torque converter in a vehicle automatic transmission, neither the torque converter nor the automatic transmission being illustrated herein. The stator assembly, generally designated 11, includes a stator 13, and a one-way clutch assembly, generally designated 15 and shown in its totality only in FIG. 2.

The stator 13 includes an annular stator hub 17, an end wall 19, and a plurality of stator blades or vanes 21 extending radially from the hub 17. In the subject embodiment, the hub 17, the end wall 19 and the blades 21 are all formed integrally, such as by injection molding in appropriate plastic material (such as a phenolic resin), or by die casting an appropriate aluminum or magnesium alloy, or other suitable material well known to those skilled in the art. Alternatively, the entire stator 13 may comprise a powdered metal part.

As is generally well known to those skilled in the art, a one-way clutch (OWC) typically includes a drive member and a driven member such that, for one direction of rotation of the drive member, the OWC transmits torque to the driven member, which rotates at the same speed as the drive member. However, if the direction of the rotation of the drive member is reversed, or if the driven member rotates faster than the drive member in the normal drive direction, the driven member merely "overruns" the drive member and no torque is transmitted through the OWC.

In the case of an OWC being utilized as part of a torque converter stator assembly, the stator 13 could comprise the "drive" member, and an internally-splined sleeve 23, which is stationary, could comprise the "driven" member. It will be understood that the designations "drive" and "driven" are somewhat meaningless in the case of a torque converter stator, and the use of these terms hereinafter will not limit the invention. What is more important is that the stator 13 must be able to overrun the sleeve 23. As is well known to those skilled in the torque converter art, at low engine speeds the one-way clutch 15 is engaged, and the stator 13 does not rotate with respect to either the impeller or the turbine (not shown). However, as engine speed increases, the OWC 15 disengages, and permits the stator 13 to free-wheel about, or overrun, the splined sleeve 23.

In accordance with one important aspect of the present invention, the OWC 15 is of the "radial" type, i.e., the drive and driven members engage on a plane which is cylindrical, and concentric with the axis of rotation of the stator assembly 11. Furthermore, in accordance with another important aspect of the present invention, a portion of the OWC 15 may be formed integrally with the stator 13. More specifically, the OWC 15 includes a drive member 25 which is illustrated in FIG. 1 as comprising a separate part from the stator 13. In this version, the drive member 25 defines a plurality of axially-extending notches 27, each of which is adapted to receive a key portion 29 (only one shown in FIG. 1), the key portions 29 preferably being molded integral with the stator hub 17. Alternatively, the entire drive member 25 could be molded integrally with the stator hub 17.

The drive member 25 defines a plurality of drive pockets 31 (see FIG. 2), there being sixteen of the drive pockets 31 in the subject embodiment. These drive pockets 31 together define a generally cylindrical drive face, generally designated 33 in FIG. 1. Each drive pocket 31 defines an axially extending drive surface 35, the function of which will be described subsequently.

Figure 2:
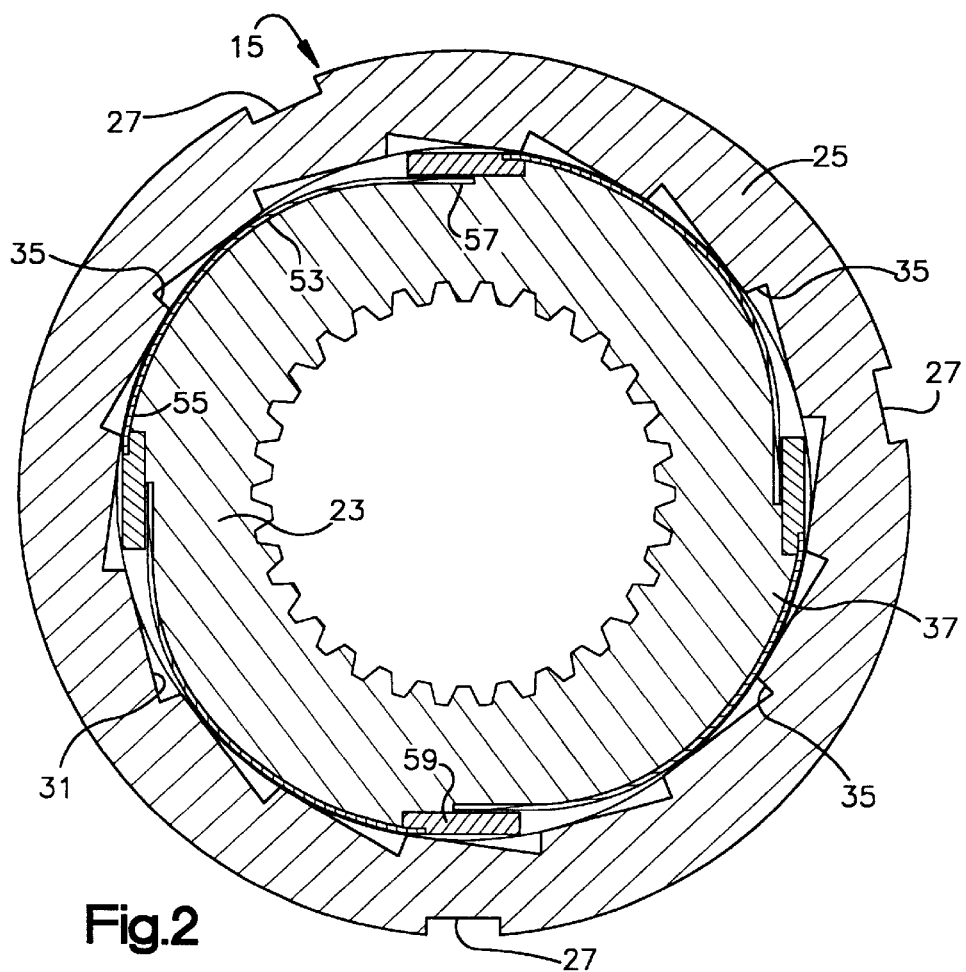
FIG. 2 is a transverse cross-section through a one-way clutch assembly, made in accordance with the present invention, illustrating the overrunning condition.
Figure 3:
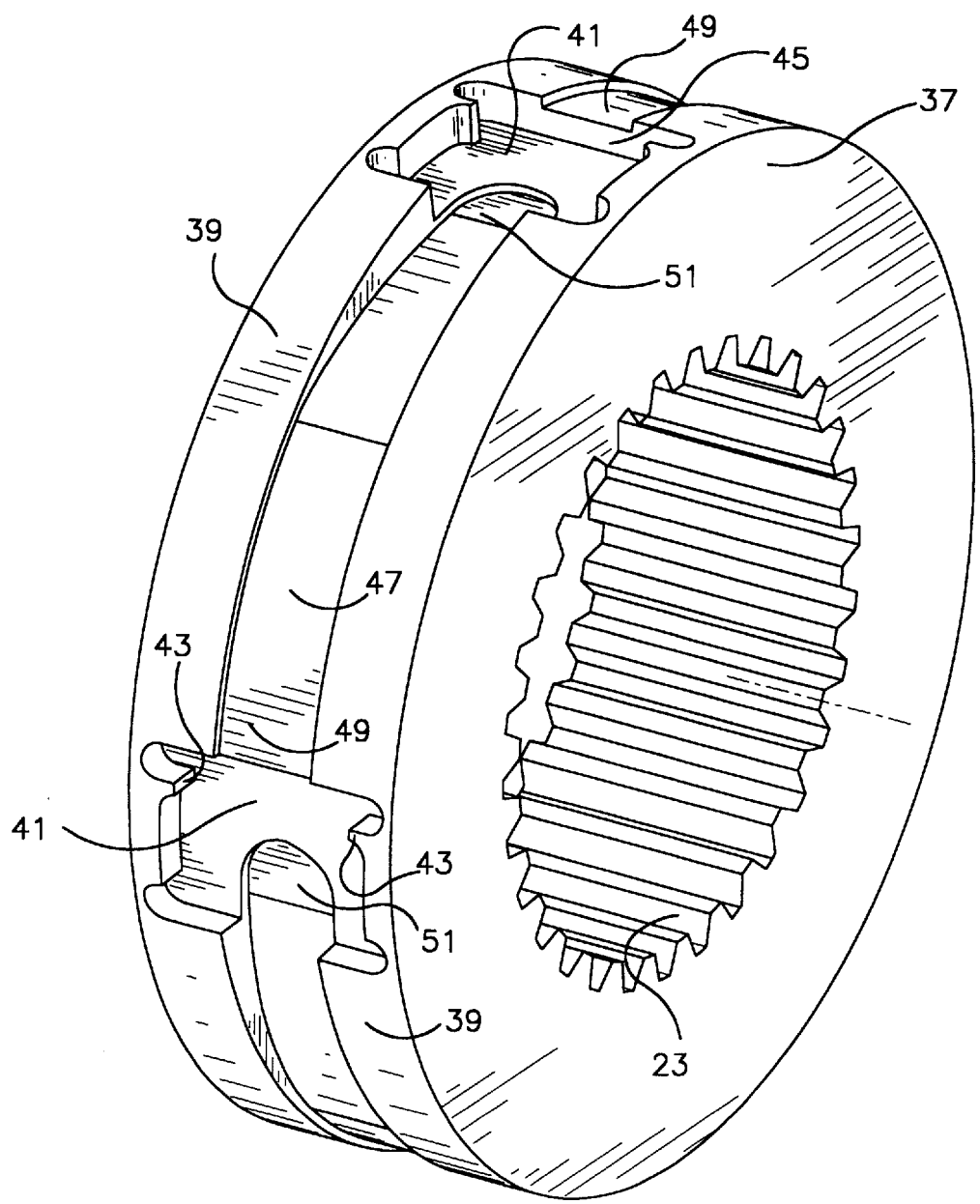
FIG. 3 is a perspective view of the driven member of the one-way clutch of the present invention.

Referring now primarily to FIG. 3, in conjunction with FIG. 2, the internally splined sleeve 23 is illustrated as comprising, or at least being formed integrally with, a driven member 37. For purposes of subsequent explanation, the sleeve 23 will be considered the radially inner portion of the member shown in FIG. 3, whereas the driven member 37 will be considered the radially outer portion of the member.

The driven member 37 includes, about its outer periphery, a driven surface 39, which defines a plurality of driven pockets 41. As may best be seen in FIG. 2, the driven member 37 includes four driven pockets 41, such that the pockets 41 are disposed, circumferentially, approximately 90 degrees from each other. Each driven pocket 41 includes a pair of oppositely disposed inward projections 43, the function of which will be described subsequently. Each driven pocket 41 includes a driven surface 45, only one of which is shown clearly in FIG. 3.

The cylindrical driven surface 39 defines a plurality of circumferentially-extending grooves 47. Each groove 47 has a relatively shallow end 49 disposed adjacent the driven surface 45 of one driven pocket 41. The groove 47 then extends clockwise (in FIGS. 2 and 3), and, at approximately its midpoint, the groove 47 begins to get deeper, until it terminates in a recess 51 which is actually disposed beneath the bottom surface of the driven pocket 41.

Figure 4:
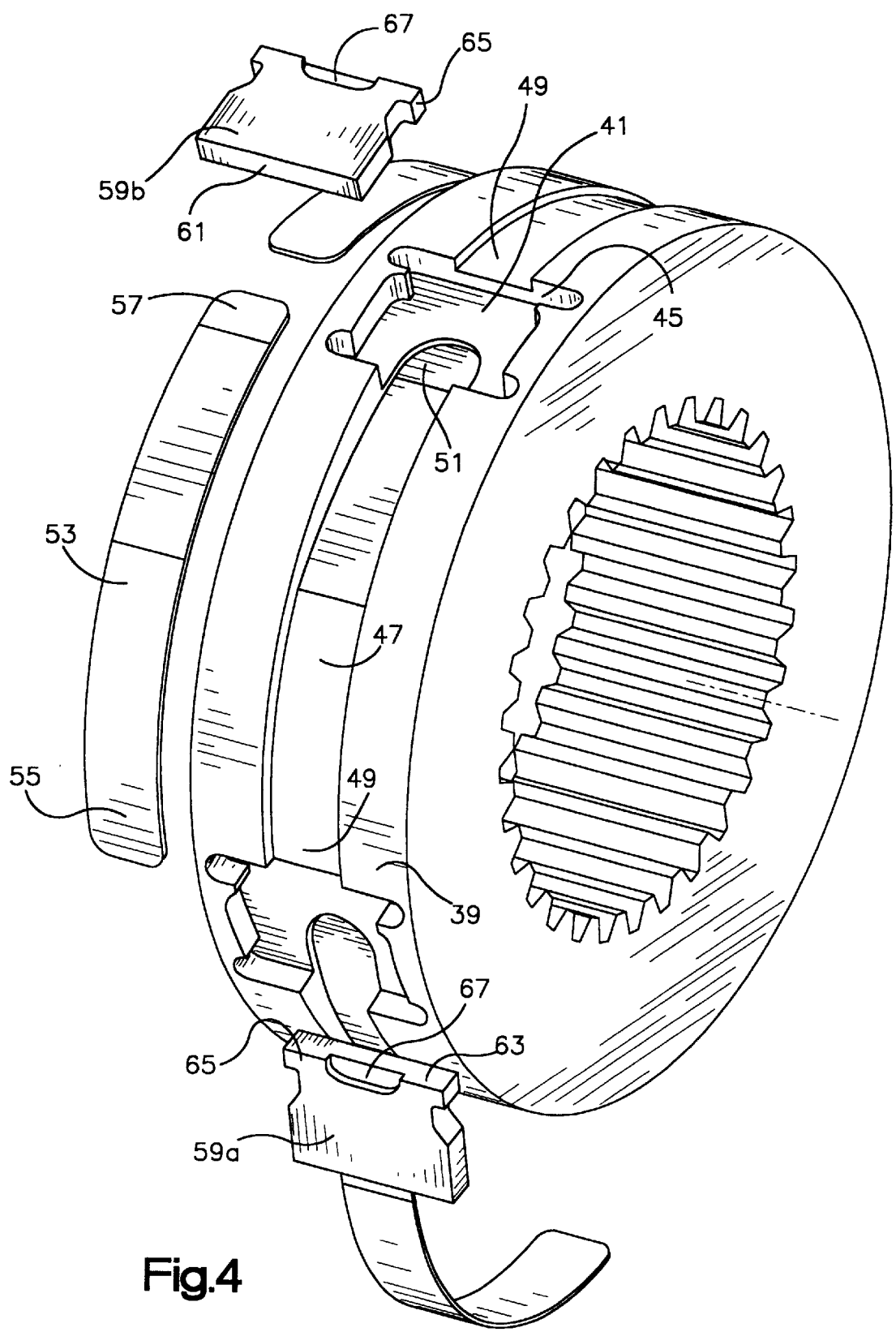
FIG. 4 is a perspective view, similar to FIG. 3, but including various parts of the one-way clutch, in preparation for assembly.

Referring now primarily to FIG. 4, the additional parts which comprise the driven assembly will now be described, as well as the assembly thereof. For each circumferentially-extending groove 47 there is provided a circumferentially-elongated spring member 53. The term "spring member" is used primarily because each member 53 preferably comprises a relatively thin, flat member made from a spring steel. Each spring member 53 includes a retaining portion 55, which is disposed generally within the shallow end 49 of the groove 47. Each spring member 53 also includes, at the opposite end thereof, a spring portion 57 which is configured to be received within the recess 51.

Preferably, each of the spring members 53 is fixed permanently within its respective groove 47, such as by means of welding, gluing, or staking. In some configurations it would also be possible to screw or rivet the spring member 53 to the driven member 37. During the course of development of the subject embodiment, it has been determined that, preferably, each spring member 53 should be attached to the groove 47 over a fairly limited area, and the point at which the spring member 53 is attached to the surface of the groove 47 should be toward the retaining portion 55, for reasons which will be explained in greater detail subsequently.

Figure 5:
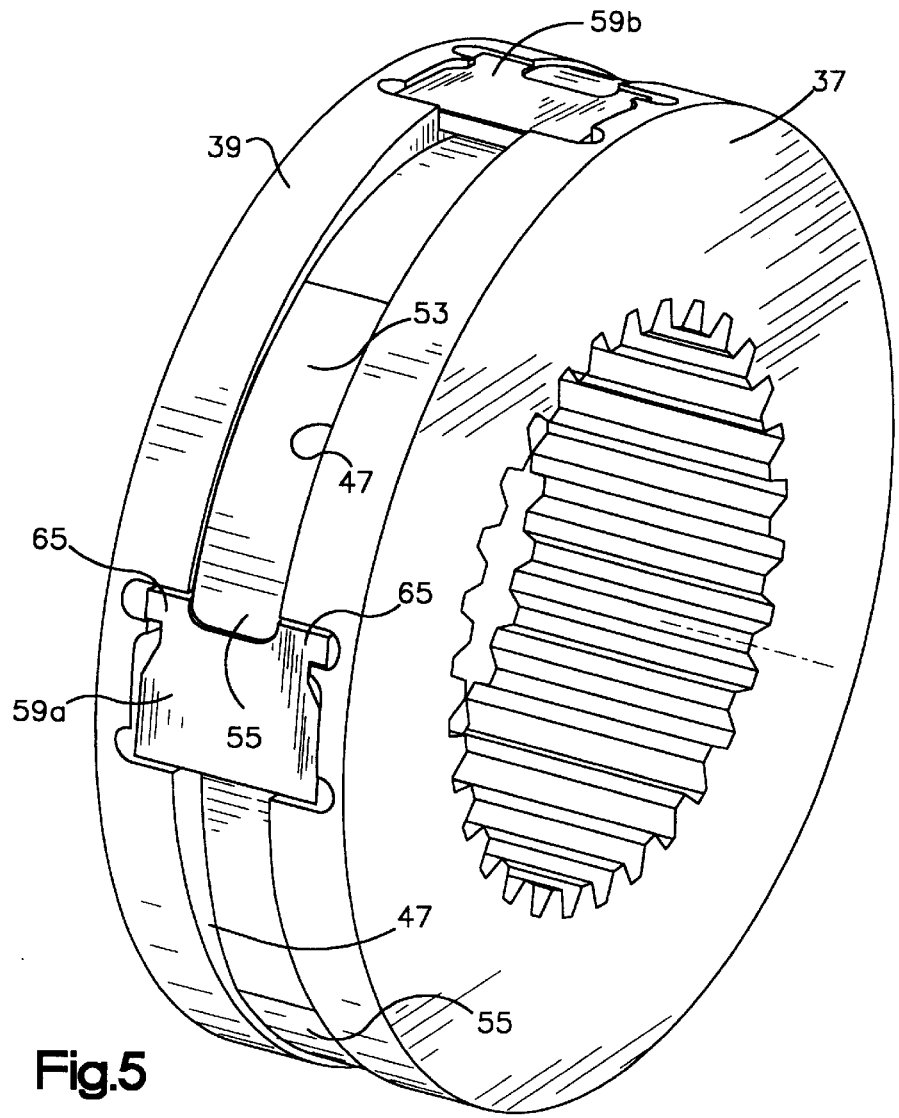
FIG. 5 is a perspective view, similar to FIGS. 3 and 4, illustrating the driven member after assembly.

After each spring member 53 has been fixed within its groove 47, in the position shown in FIG. 5, subsequently, a pawl or "strut" 59 is disposed within each driven pocket 41. In the views of FIGS. 4 and 5, in which two of the pawls 59 are shown, one is labeled "59a" and the other is labeled "59b", for reasons which will become apparent subsequently. Each pawl 59 includes a driven surface 61 (see FIG. 4), adapted to be in engagement with the drive surface 35 of the drive member 25, when the drive member 25 is transmitting torque to the driven member 37, i.e., is in the "drive" position of FIG. 6. Each pawl 59 also defines a driving surface 63 (see FIG. 4) which is in engagement with the driven surface 45 of the driven member 37. It should be noted that in FIG. 6 there is a clearance indicated, for ease of illustration only, between the surfaces 35 and 61, and between the surfaces 45 and 63, but during the drive condition those pairs of surfaces would be in driving contact.

Each pawl 59 also defines a pair of ear portions 65 which, as may best be seen in FIG. 5, are held in place between the inward projections 43 and the driven surface 45 such that, when the drive member 25 "overruns" the driven member 37 (i.e., rotates counterclockwise in FIG. 2 relative to the member 37), the pawls 59 will be retained within the pocket 41, rather than being dragged out of their pockets by the overrunning member 25.

Each pawl 59 also defines a shallow recess 67 (see FIG. 4) which, preferably, has a depth approximately equal to the thickness of the spring member 53. In order to assemble the pawls 59 into the pockets 41, it is first necessary to lift slightly the retaining portion 55 of the spring member 53 sufficiently to position the pawl 59 within the pocket 41. When the retaining portion 55 is released, it is then disposed within the shallow recess 67, such that it is able to retain that end of the pawl in place within the pocket, as the pawl moves between a retracted position, wholly within its pocket (FIGS. 2 and 5) and a drive position (FIG. 6) as was described previously. As each pawl 59 is put in its assembled position within its driven pocket 41 (FIG. 5), it has a radially inner surface 69 disposed on top of and in engagement with the spring portion 57 of the spring member 53.

By viewing FIG. 5, it may be appreciated how the present invention is able to accomplish the objects discussed in the BACKGROUND OF THE DISCLOSURE. The driven assembly shown in FIG. 5 includes a total of nine parts, the driven member 37, four of the spring members 53 and four of the pawls 59. In accordance with one important aspect of the invention, each spring member 53 is operably associated with two adjacent pawls 59a and 59b. Each spring includes the retaining portion 55 engaging the radially outer surface (the recess 67) of the pawl 59a to retain part of pawl 59a in its pocket 41, while also including a spring portion 57 engaging the radially inner surface 69 of the pawl 59b, biasing another portion of pawl 59b toward the drive position of FIG. 6.

Furthermore, with the spring members 53 disposed in the grooves 47, and each of the pawls 59 disposed in its respective pocket 41, the entire driven assembly may be held in a position in which its axis of rotation is vertical, and dropped into place within the drive member 25, which would also be oriented such that its axis of rotation would be vertical. In order to perform such a "drop-in" assembly of the driven assembly, those skilled in the art will appreciate that the pawls 59 must be forcibly retained within their pockets 41, because, in the absence of such restraint, the pawls are being biased radially outward to the position shown in FIG. 6 by the spring portions 57. However, various means are known to those skilled in the art for performing such an assembly task. For example, it would be possible to use the "tapered cylinder" approach in which a cylinder would be placed on top of the drive member 25, with its large diameter at the top and its small diameter disposed immediately adjacent the drive member 25. The small diameter would be just slightly greater than the diameter of the driven surface 39. As the driven assembly passed axially through the tapered cylinder, the pawls 59 would gradually be moved from the radially outward drive position of FIG. 6 toward the retracted position of FIG. 2, just before dropping into place within the drive member 25. Those skilled in the art would be aware of other suitable assembly techniques, and the present invention is not limited to any one particular assembly method.

Figure 6:
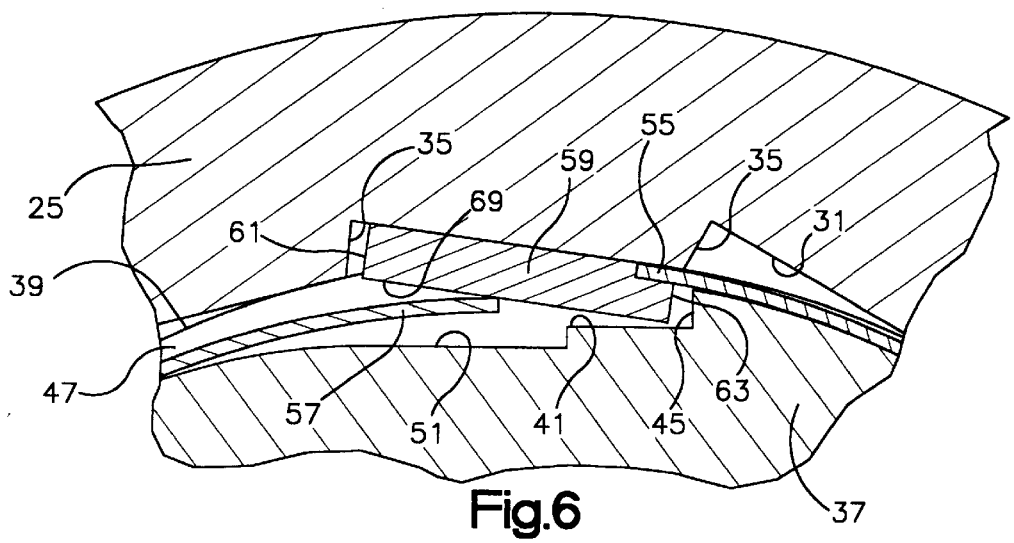
FIG. 6 is an enlarged, fragmentary transverse cross-section, similar to FIG. 2, illustrating the drive condition of the one-way clutch assembly of the present invention.

Referring now primarily to FIGS. 2 and 6, it is important that the recess 67 in the radially outer surface of the pawl 59 extends far enough circumferentially such that the retaining portion 55 of the spring 53 is able to perform its function of retaining the pawl 59 within the pocket. On the other hand, the retaining portion 55 must not extend so far circumferentially along the radially outer surface (the recess 67) such that it prevents the spring portion 57 from moving the pawl 59 from the retracted position of FIG. 2 to the drive position of FIG. 6, and doing so within a fairly short period of time. Similarly, the spring portion 57 of the spring 53 must engage the radially inner surface 69 at such a location that it is able to perform its biasing function.

Figure 7:
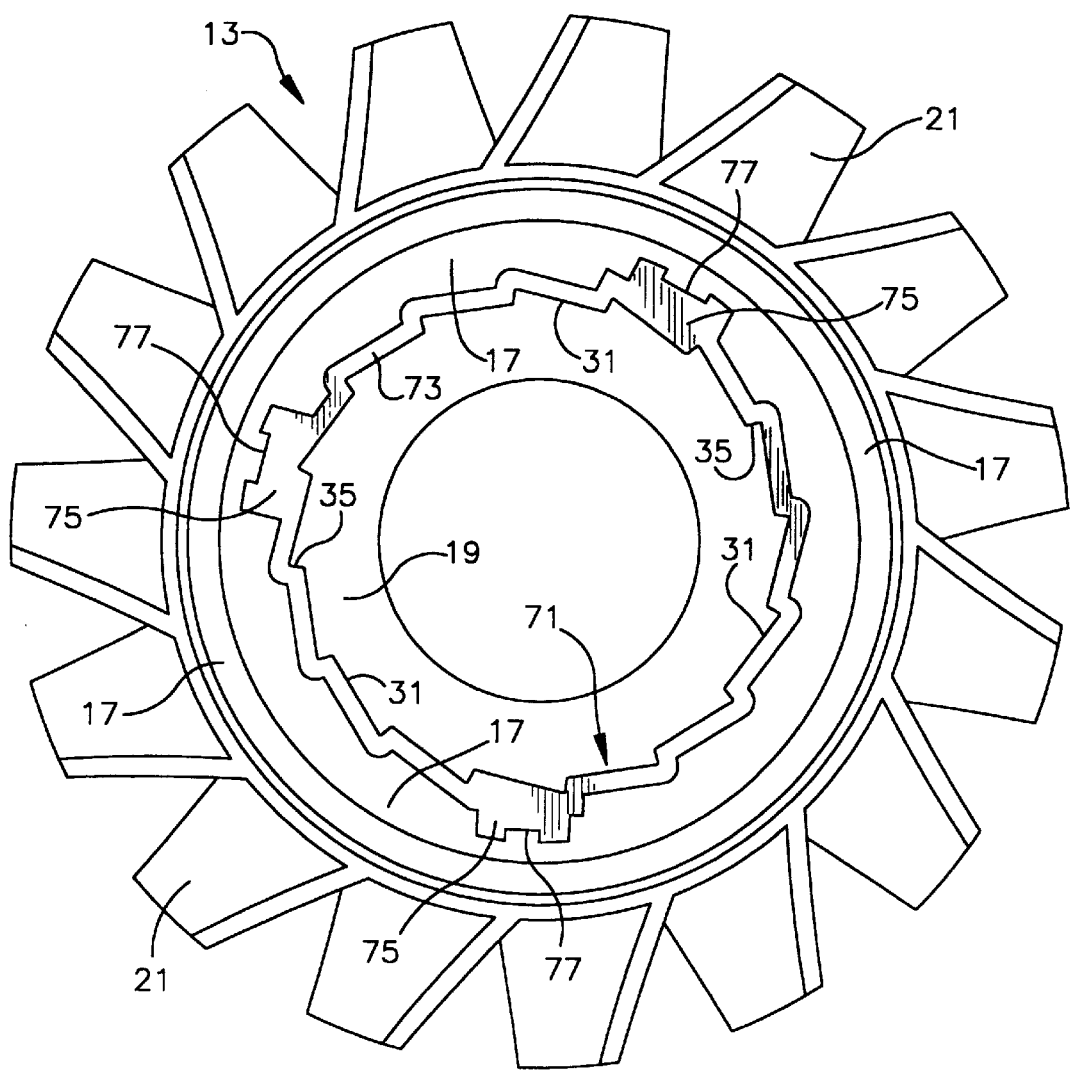
FIG. 7 is an end view of an alternative embodiment of a stator assembly, including the drive member, made in accordance with the present invention.

Referring now primarily to FIG. 7, there is illustrated an alternative embodiment in which like elements bear like numerals, and new or substantially modified elements bear numerals in excess of "70". In FIG. 7, there is a modified stator 13 having a hub 17 and recessed therein is a drive portion 71 which is formed to be integral with the stator hub 17. Preferably, the drive portion 71 comprises a generally annular drive member 73 comprising a hardened steel (or other suitable metal) insert, the outer surface of which includes several lock portions 75, each defining an axially-extending notch 77. The drive member 73 is relatively thin in the radial direction, so that the overall stator assembly will be as light as possible, with the insert member 73 being shown as having a generally uniform thickness over most of its circumferential extent. The drive member 73 could comprise an extrusion, or could be formed in some other suitable manner.

The inner surface of the insert member 73 comprises a drive face, as in the previous embodiment, and defines the drive pockets 31 and the drive surfaces 35, each of which would preferably have about the same axial extent as in the previous embodiment. Those skilled in the art will recognize that the operation of the one-way clutch assembly, including the stator of FIG. 7, will be the same as for the previous embodiment.

As one assembly option, the stator hub 17 may be molded with an internal surface conforming to the outer profile of the drive member 73, including portions adapted to extend into the notches 77. The drive member 73 would then be inserted as a "drop-in" member within the molded stator hub 17.

Alternatively, the hardened drive member 73 could comprise a mold insert, i.e., it could be placed within the molding die, prior to molding the stator 13, such that the stator hub 17 would be molded about the outer periphery of the drive member 73. In either case, the result would be a light weight stator, with a hardened insert or liner of steel or other suitable material.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A one-way clutch assembly of the type including a radial driven member mounted for rotation about an axis, said radial driven member including a cylindrical driven face disposed parallel to said axis; a radial drive member mounted for rotation about said axis, and having a drive direction of rotation, said radial drive member including a cylindrical drive face, disposed concentrically about said driven face, and spaced apart therefrom; said radial drive member defining a plurality of drive pockets, each including a drive surface; said driven face defining a plurality of driven pockets, each including a driven surface; a plurality N of pawls disposed in one of said drive and driven pockets, each of said pawls comprising a separate member, and having a retracted position in which each pawl is disposed wholly within said one of said drive and driven pockets, and a drive position in which each pawl engages both said drive surface and said driven surface, as said drive and driven members transmit torque in said drive direction of rotation; means operable to bias said pawls toward said drive position; characterized by:

(a) said means operable to bias said pawls comprising a plurality N of circumferentially-elongated spring members, each being disposed circumferentially between first and second adjacent pawls;

(b) each spring member including a retaining portion in engagement with a radially outer surface of said first pawl to retain one portion of said first pawl in its pocket, and a spring portion in engagement with a radially inner surface of said second pawl to bias another portion of said second pawl toward said drive position.

2. A one-way clutch assembly as claimed in claim 1, characterized by each of said driven pockets being generally rectangular, and each of said pawls being generally rectangular and flat, and including generally axially oriented driven and driving surfaces.

3. A one-way clutch assembly as claimed in claim 1, characterized by said one-way clutch assembly comprising part of a stator assembly adapted for use in a torque converter, said stator assembly being of the type comprising a stator hub and a plurality of stator blades, at least a part of said drive member being fixed to rotate with said stator hub.

4. A one-way clutch assembly as claimed in claim 1, characterized by each of said plurality N of spring members comprising an elongated, generally flat member of generally uniform thickness, each of said spring members having a fixed end and a free end.

5. A one-way clutch assembly as claimed in claim 4, characterized by said retaining portion of said spring member being disposed immediately adjacent said fixed end, and said spring portion of each of said spring members comprising said free end.

6. A one-way clutch assembly as claimed in claim 1, characterized by each of said spring members being disposed in a circumferentially-extending groove, which extends circumferentially from a first pocket in which is disposed said first pawl to a second pocket in which is disposed said second pawl.

7. A one-way clutch assembly as claimed in claim 6, characterized by each of said circumferentially-extending grooves being disposed axially between a pair of generally annular portions of said driven surface, thereby retaining said spring members whenever said drive and driven members have their axes of rotation oriented vertically during assembly.

* * * * *